United States Patent
Huang et al.

(10) Patent No.: US 8,284,353 B2
(45) Date of Patent: Oct. 9, 2012

(54) DISPLAY PANEL WITH COLOR FILTER ON PIXEL SUBSTRATE COVERING LEAD LINES

(75) Inventors: Yen-Heng Huang, Taipei County (TW); Chung-Kai Chen, Taichung County (TW); Chia-Hui Pai, Taichung (TW); Wei-Yuan Cheng, Taichung (TW); Wen-Hsien Tseng, Taichung (TW); Ting-Yi Cho, Taipei (TW); Chin-An Tseng, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 317 days.

(21) Appl. No.: 12/637,772

(22) Filed: Dec. 15, 2009

(65) Prior Publication Data

US 2010/0328586 A1 Dec. 30, 2010

(30) Foreign Application Priority Data

Jun. 24, 2009 (TW) .............................. 98121141 A

(51) Int. Cl.
*G02F 1/1333* (2006.01)
*G02F 1/1345* (2006.01)
*G09G 3/36* (2006.01)
(52) U.S. Cl. ........ 349/106; 349/149; 349/151; 349/152; 345/88; 345/104
(58) Field of Classification Search .............. 349/42–43, 349/106, 149–152, 153, 190; 345/88, 92, 345/104; 257/59, 72
See application file for complete search history.

(56) References Cited

U.S. PATENT DOCUMENTS

| | | | |
|---|---|---|---|
| 6,031,512 A | 2/2000 | Kadota et al. | |
| 6,992,738 B2 | 1/2006 | Ishihara et al. | |
| 2005/0140892 A1 | 6/2005 | Kim et al. | |
| 2006/0001790 A1* | 1/2006 | Chu et al. ...................... | 349/44 |
| 2007/0030409 A1* | 2/2007 | Aoki ............................. | 349/56 |
| 2007/0296674 A1* | 12/2007 | Aoki et al. ..................... | 345/94 |
| 2008/0123032 A1* | 5/2008 | Taniguchi et al. ............ | 349/113 |
| 2008/0179595 A1* | 7/2008 | Song et al. .................... | 257/59 |

FOREIGN PATENT DOCUMENTS

| | | |
|---|---|---|
| CN | 101093333 | 12/2007 |
| TW | 200712606 | 4/2007 |

OTHER PUBLICATIONS

"1st Office Action of China counterpart application", issued on May 25, 2010, p. 1-p 4.

* cited by examiner

*Primary Examiner* — Hoan C Nguyen
(74) *Attorney, Agent, or Firm* — Jianq Chyun IP Office

(57) ABSTRACT

A display panel having a display region and a non-display region is provided. The display panel includes a first substrate, a second substrate and a display medium between the first substrate and the second substrate. The substrate has a pixel array, a plurality of lead lines, an organic layer and a conductive pattern thereon. The pixel array is disposed within the display region. The lead lines are disposed within the non-display region and electrically connected to the pixel array. The organic layer covers the pixel array and the lead lines. The conductive pattern is disposed on the organic layer in the lead lines. The second substrate has an electrode layer thereon, and the electrode layer is disposed within the display region and the non-display region. In particular, the electrode layer and the conductive pattern are electrically connected to a common voltage.

15 Claims, 8 Drawing Sheets

DISPLAY PANEL WITH COLOR FILTER ON PIXEL SUBSTRATE COVERING LEAD LINES

CROSS-REFERENCE TO RELATED APPLICATION

This application claims the priority benefit of Taiwan application serial no. 98121141, filed on Jun. 24, 2009. The entirety of the above-mentioned patent application is hereby incorporated by reference herein and made a part of specification.

BACKGROUND OF THE DISCLOSURE

1. Technical Field

The present disclosure relates to a display panel. More particularly, the present disclosure relates to a color filter on array (COA) or a black matrix on array (BOA) display panel.

2. Description of Related Art

The advancement of the electro-optical and semiconductor device technologies leads to the thriving development of flat panel display (FPD). Among the various display media, the liquid crystal display provides the favorable features of reduced operation voltage, low power consumption, free radiation, reduced dimension and weight, etc. Hence, the liquid crystal display gradually replaces the conventional cathode ray tube display and becomes the mainstream of displays in recent years. Generally speaking, the liquid display panel in a liquid crystal display is constituted with a pixel array substrate, a color filter array substrate, and a liquid crystal layer sandwiched between the two substrates (the pixel array substrate and the color filter array substrate).

Further, the lead lines are used to electrically connect the pixel array and the driving circuit. Typically, only the black matrix positioned at the color filter array substrate covers the lead lines at the pixel array substrate with the liquid crystal layer in between to prevent light leakage at where the lead lines are located. The lead lines (for example, gate lead lines) refer to the section of the lines used in connecting the signal lines (for example, gate lines) with the external devices. The lead lines are not signal lines (for example, gate lines) in the pixel array for forming the pixel region. Moreover, the black matrix is unable to block light fully one hundred percent. Further, the voltage input to these lead lines (for example, gate lead lines) is higher and the distance between the lead lines is small. Hence, the liquid crystal molecules above the lead lines (for example, gate lead lines) are easily influenced by the voltage of the lead lines (for example, gate lead lines), leading to light leakage at the location of the lead lines (for example, gate lead lines).

SUMMARY OF THE DISCLOSURE

In view of the foregoing, one of the embodiment provides a display panel, wherein the problem of light leakage at where the lead lines (for example, the gate lead lines) are is resolved.

One embodiment of the present disclosure provides a display panel that includes a display region and a non-display region. The above-mentioned display panel includes a first substrate, a second substrate and a display medium in between the first substrate and the second substrate. The first substrate includes a pixel array, a plurality of lead lines, an organic layer and a conductive pattern disposed thereon. The pixel array is disposed within the display region. The lead lines are disposed within the non-display region and electrically connected to the pixel array. The organic layer covers the pixel array and the lead lines. The conductive pattern is disposed on the organic layer in the lead lines. The second substrate includes a transparent electrode layer disposed thereon, and the transparent electrode layer is disposed within the display region and the non-display region. In particular, the transparent electrode layer and the conductive pattern are electrically connected to a common voltage.

According to one of the embodiment, a conductive pattern is disposed on the organic layer, which is positioned above the lead lines, and the conductive pattern and the transparent electrode layer on the counter substrate are electrically connected to a common voltage. Since the conductive pattern and the transparent electrode layer are at a state of common voltage, the liquid crystal molecules above the lead lines are not affected by the voltage of the lead lines and prevented from generating an undesired twist. The problem of light leakage from where the lead lines are located is further mitigated.

It is to be understood that both the foregoing general description and the following detailed description are exemplary, and are intended to provide further explanation of the disclosure as claimed.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 2 is a top view diagram of the first substrate of the display panel in FIG. 1, wherein FIG. 1 is the cross-sectional view of FIG. 2 at the cutting line I-I'.

DESCRIPTION OF THE PREFERRED EMBODIMENTS

Figure 1:
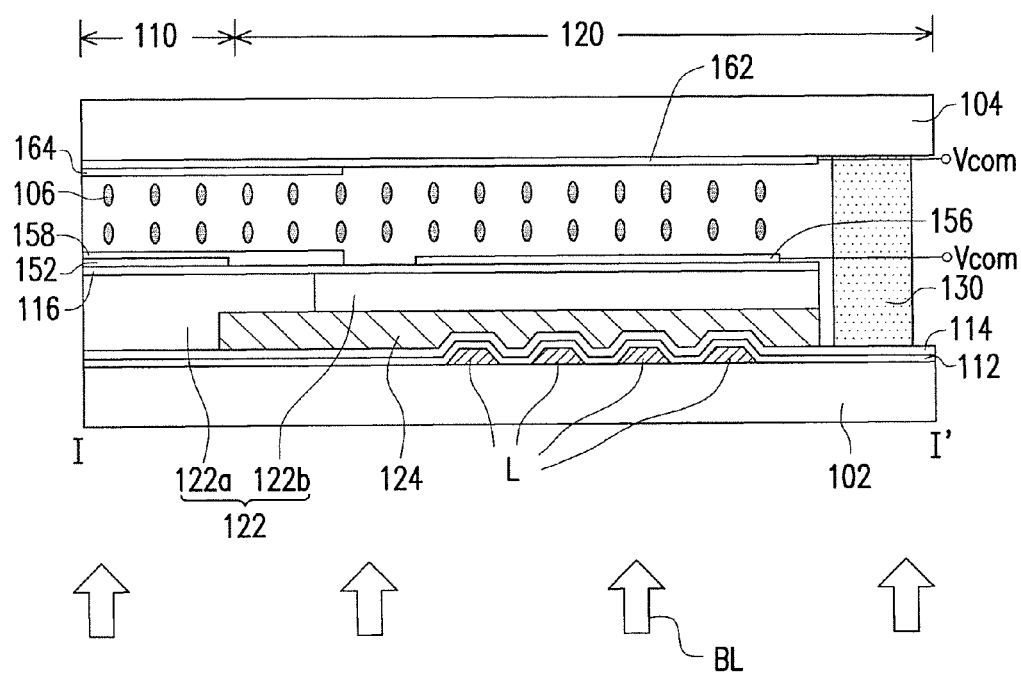
FIG. 1 is a schematic partial, cross-sectional diagram of a display panel.
Figure 2:
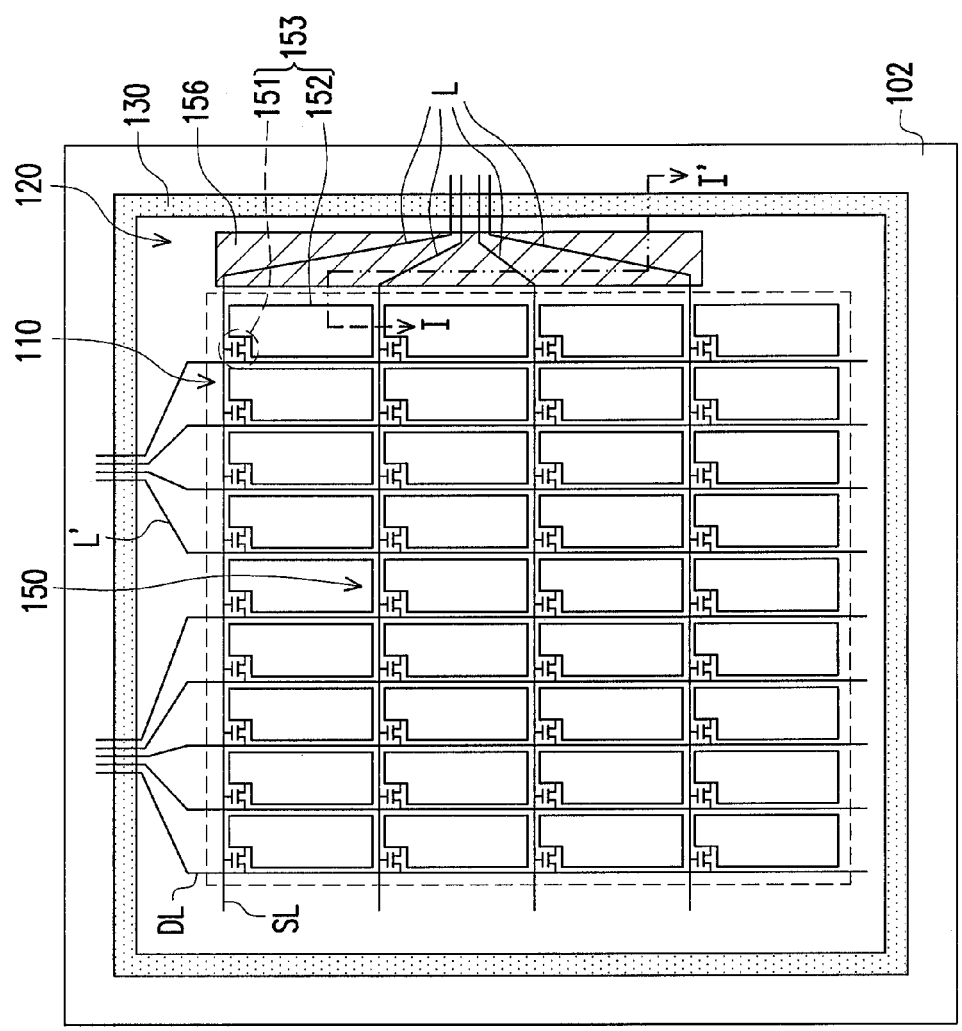

FIG. 1 is a schematic, partial cross-sectional diagram of a display panel according to a first exemplary embodiment of the disclosure. FIG. 2 is a top view diagram of the first substrate of the display panel in FIG. 1, wherein FIG. 1 is the cross-sectional view of FIG. 2 at the cutting line I-I'. Further, the color filter layer, the black matrix and the film layer disposed thereon are not illustrated in FIG. 2.

Referring to both FIGS. 1 and 2, the display panel according to this exemplary embodiment of the disclosure includes a display region 110 and a non-display region 120 positioned at the periphery of the display region 110. In other words, the non-display region 120 encircles the display region 110. The display panel includes a first substrate 102, a second substrate 104, and a display medium 106. Wherein, the first substrate 102 and the second substrate 104 are assembled together with a sealant 130. The display medium 106 is configured in a region enclosed by the first substrate 102, the second substrate 104 and the sealant 103. Wherein, the display medium 106 includes, but not limited to, liquid crystal molecules, or an electrophoresis material, or other appropriate materials.

More particularly, the first substrate 102 includes a pixel array 150, lead lines L, an organic layer 122 and a conductive pattern 124 disposed thereon.

The pixel array 150 is disposed within the display region 120. The pixel array 150 is formed with a plurality of pixel structures 153, scan lines SL (or namely gate line) and data lines DL that are electrically connected with the pixel structures 153. Generally speaking, each pixel structure 153 includes an active device 151 and a pixel electrode 152 that is electrically connected to the active device 151. Further, each pixel structure 153 and the corresponding data line DL and scan line SL are electrically connected. The scan lines SL and the data lines DL extend to the non-display region 120, and the sections of the scan lines LS and the data lines DL extended to the non-display region 120 are known as the lead lines L, L'. In other words, the lead lines L that are connected to the scan lines SL are concurrently formed with the scan lines SL, while the lead lines L' that are connected to the data lines DL are concurrently formed with the data lines DL. The lead lines L, L' serve to electrically connect the pixel array 150 and the driving circuit (not shown) for inputting the signals of the driving circuit to the pixel array 150. In other words, the lead lines L, L' are sections of the lines that are respectively configured between the scan lines SL and the driving circuit (not shown), and between the data lines DL and the driving circuit (not shown). If the driving circuit is disposed above the first substrate 102, it is known as circuit on board. However, the driving circuit may not be disposed above the first substrate 102. It is essential to note that the driving circuit (not shown) is not an active device 151 in the pixel array 150. Instead, the driving circuit is a circuit that provides scan signals at the scan lines SL and data signals at the data lines DL, respectively. Due to the fabrication process of pixel array 150, the lead lines L are covered with an insulation layer 112 and a passivation layer 114, as shown in FIG. 1, wherein the insulation layer 112 is also known as a gate insulation layer, and the passivation layer 114 covers the top of each transistor of the pixel array 150. In other words, the passivation layer 114 is disposed on the source/drain region of each transistor.

The organic layer 122 covers the passivation layer 114. In one embodiment of the disclosure, the organic layer 122 includes a color filter layer. However, the present disclosure is not limited as such. In other embodiments of the disclosure, the organic layer 122 may be a flatness layer or other organic film layers. In this embodiment of the disclosure, the organic layer 122a in the display region 110 also includes red, green and blue color filter patterns, whereas the organic layer 122b in the non-display region 120 preferably includes a blue color filter pattern. It is appreciated that the disclosure is not limited as such. The organic layer 122b configured in the non-display region 120 may also includes filter pattern of other colors, such as red color or green color filter pattern.

More particularly, in this embodiment of the disclosure, further includes a light shielding pattern layer 124 is disposed under the organic layer 122, wherein the light shielding pattern layer 124 is configured in both the display region 110 and the non-display region 120. The light shielding pattern layer 124 in the display region 110 is a reticular structure (or namely meshed structure), and each grid of the reticular structure (or namely each blank space of the reticular structure) corresponds to one pixel structure (or known as a pixel region or known as an effective display region). Hence, the light shielding pattern layer 124 is also known as black matrix. The light shielding pattern 124 in the non-display region 120 is a ring-shaped structure or a frame structure, enclosing the surrounding of the display region 110. More particularly, the light shielding pattern 124 in the non-display region 120 covers the lead lines L, and the organic layer 122b covers the light shielding pattern 124, which is configured above the lead lines L. In one embodiment of the disclosure, this organic layer 122b is a blue color filter pattern. In this embodiment of the disclosure, a material of the light shielding pattern 124 includes black resin, for example.

In other embodiment of the disclosure, the organic layer 122 is also covered with another passivation layer 116. The passivation layer 116 may be a single-layered or a multi-layered structure, and a material thereof includes an inorganic insulation material (for example, silicon nitride, silicon oxide, silicon oxynitride, silicon-rich nitride, silicon-rich oxide, silicon-rich oxynitride, nitrogen-rich silicon, oxygen-rich silicon, oxynitride-rich silicon, or other suitable materials, or a combination thereof), an organic insulation material (for example, polyester (PET), polyolefin film, polypropylene, polycarbonate film, polyalkylene oxide film, polystyrene film, polyether film, polyketone film, polyalcohol film, polyaldehyde film, or other appropriate materials or a combination thereof), or other suitable materials, or any combination thereof. Further, the passivation layer 116 may also known as a flatness layer or an overcoat layer, wherein a material in forming the passivation layer 116 includes the above described materials. In other embodiment of the disclosure, the passivation layer 116 may be omitted.

The pixel electrode 152 in the above pixel array 150 is formed above the passivation layer 116. The pixel electrode 152 is electrically connected to the active device 151 through a contact hole formed in the passivation layer 116 and the organic layer 122.

Further, a conductive pattern 156 is disposed on the passivation layer 116 of the non-display region 120, and this conductive pattern 156 is configured on the organic layer 122 in the lead lines L. In this embodiment of the disclosure, the conductive pattern 156 and the pixel electrode 152 are preferably formed simultaneously. Hence, the conductive pattern 156 and the pixel electrode 152 are formed with a same material, for example, transparent metal oxide (such as, indium tin oxide, indium zinc oxide, indium germanium zinc oxide, aluminum zinc oxide, indium germanium oxide, indium aluminum oxide, or other appropriate materials, or a combination thereof). It should be appreciated that the materials used in forming the conductive material 156 and the pixel electrode 152 are not limited to the materials above. In this embodiment of the disclosure, the conductive pattern 156 and the pixel electrode 152 are apart from each other. Preferably, the conductive pattern 156 and the pixel electrode 152 are electrically insulated. In this embodiment of the disclosure, the shape of the conductive pattern 156 is rectangular shape. It should be appreciated that the shape of the conductive patter 156 of the present disclosure is not limited as such. The conductive pattern 156 could be in other shapes, for example, a finger structure or a polygonal structure, etc., as long as the conductive pattern is configured above the lead lines L.

Further, an alignment layer 158 is also disposed in the display region 110 of the first substrate 102, wherein the alignment layer 158 is used in providing the display medium 106 to have a pre-determined angle. In this embodiment of the disclosure, it may be preferred to dispose the alignment layer 158 in the display region 110. In other words, the alignment layer 158 is disposed on the pixel electrode.

Additionally, the second substrate 104 is configured opposite to the first substrate 102. The second substrate 104 includes a transparent electrode layer 162 thereon, wherein the transparent electrode layer 162 is configured in both the display region 110 and the non-display region 120. In other words, the transparent electrode layer 162 extends to the non-display region 120. Moreover, the second substrate 104 further includes an alignment layer 164 disposed thereon in the display region 110, wherein the alignment layer 164 is used in providing the display medium 106 to have a pre-determined angle. In this embodiment of the disclosure, the alignment layer 158 is disposed correspondingly to the alignment layer 164. In other words, the edge of the alignment layer 158 is aligned with the edge of the alignment layer 164. More particularly, the transparent electrode layer 162 and the conductive pattern 156 on the first substrate 102 are electrically connected to one common voltage. The transparent electrode layer 162 may form with the material of the pixel electrode 152, or the transparent electrode layer 162 and the pixel electrode 152 may form with different materials. It is important to note that the transparent electrode layer 162 may not form with an opaque material (such as gold, silver, copper, aluminum, titanium, tantalum, alloy, or other suitable materials or a combination thereof). It is because an observer makes an observation from the exterior surface of the second substrate 104 and notices the light beam of light source of the back light BL. In other words, the observer is positioned outside the surface of the second substrate 104 without the presence of the alignment film 164 and the transparent electrode 162. If the material of the transparent electrode 162 is replaced with non-transparent material, an observer is unable to make the above observation.

Since the transparent electrode layer 162 and the conductive pattern 156 are electrically connected to one common voltage, the portion of the display medium 106 (liquid crystal molecules) configured in between the transparent electrode layer 162 and the conductive pattern 156 is prevented from generating an undesired twist. In other words, due to the sheltering of the conductive pattern 156, the voltage of the lead lines is unable to influence the liquid crystal molecules 106 above to generate an undesired twist. Hence, the liquid crystal molecules 160 above the lead lines maintain a vertical arrangement. Accordingly, the backlight light source BL provided from the back side of the first substrate 102 is not emitted through the second substrate 104 due to the vertical arrangement of the liquid crystal molecules above the lead lines. The situation of light leakage is thereby obviated.

More particularly, in this embodiment of the disclosure, aside from having the liquid crystal molecules 106 vertically arranged at where the conductive pattern 156 is configured above the lead lines, the lead lines L are also covered with a light shielding pattern layer 124 and a blue-color filter pattern 122b to preclude the backlight light source BL from reaching the second substrate 104 and emitting through the second substrate 104. Since the blue color filter pattern 122b provides a better light absorption effect than other colors filter pattern, the blue color filter pattern is applied as the organic layer 122b above the lead lines L in this embodiment of the disclosure. It should be appreciated that other colors filter pattern or color layer having better light absorption effect that the blue color filter pattern falls within the principles of this disclosure. Further, in this embodiment of the disclosure, the lead lines L are covered with the light shielding pattern layer 124. However, in other embodiments of the disclosure, the light shielding pattern layer 124 could be omitted.

Figure 3:
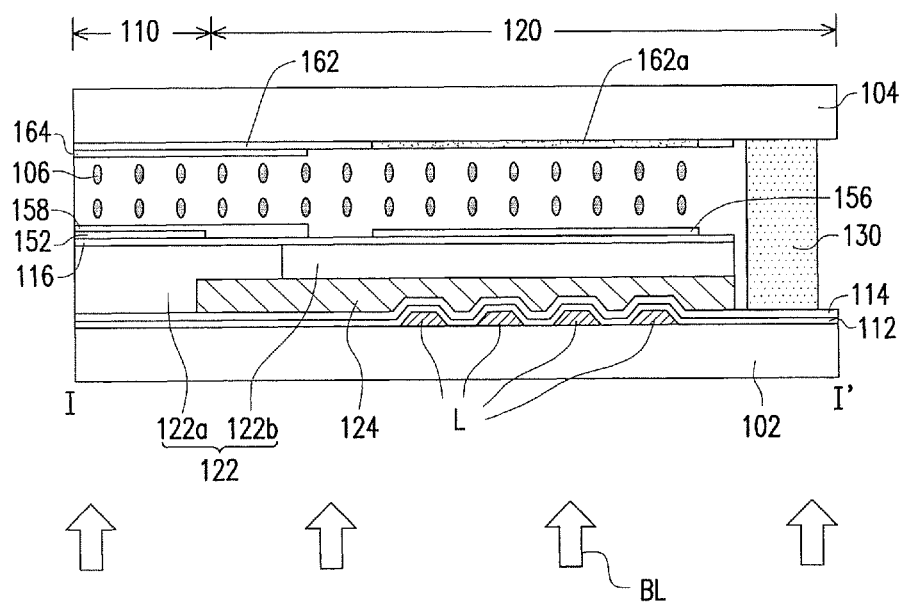
FIGS. 3-13 are partial, sectional-view diagrams of display panels according to several exemplary embodiments.

To further reduce light leakage above the lead lines L, an opaque region 162a may form above the second substrate 104 as shown in FIG. 3 according to other embodiment of the disclosure. The structure in the exemplary embodiment shown in FIG. 3 is similar to that in FIG. 1. The difference between the structures in the exemplary embodiments illustrated in FIGS. 1 and 3 lies in an opaque region 162a being formed above the second substrate 104, wherein the opaque region 162a is configured at where the alignment film 164 is not formed. The above opaque region 162a may form with laser burn technology, for example, applying a laser at a wavelength of about 200 nanometer (nm) to about 400 nm and with a power of about 1 megawatt (MW) to about 10 MW to burn the transparent electrode layer 162, such that the transparent electrode layer 162 is resulted with an opaque region 162a correspondingly above the lead lines. Moreover, this opaque region 162a still has conductive property. Moreover, in other embodiments of the disclosure, the opaque region 162a may form by, for example, ink-printing or depositing an opaque layer on the transparent electrode layer 162 correspondingly above the lead lines.

Figure 4:
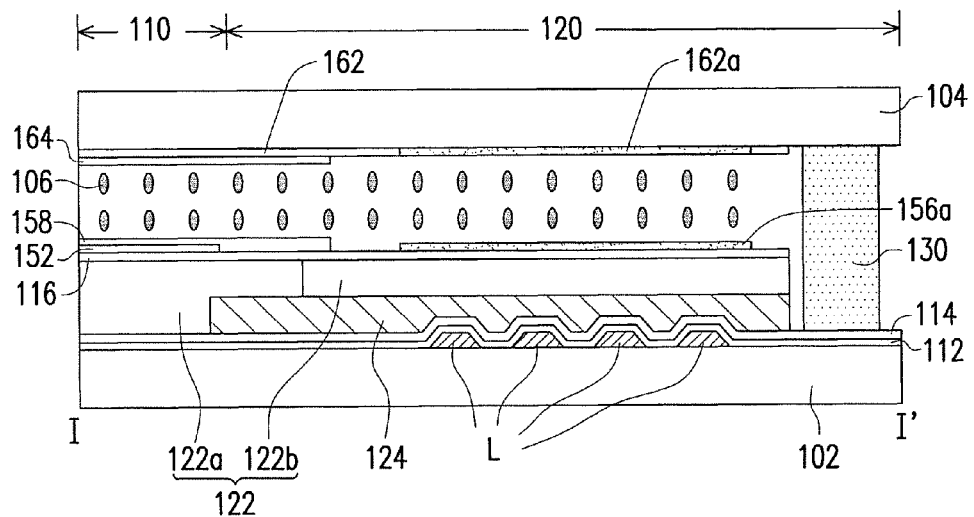

In accordance to another embodiment of the disclosure, aside from forming an opaque region 162a above the second substrate 104, an opaque conductive pattern 156a may also be used, as shown in FIG. 4. The structure in the exemplary embodiment shown in FIG. 4 is similar to that in FIG. 3. The difference between the two aspects lies in the conductive pattern 156a on the first substrate 102 being an opaque conductive pattern (such as, gold, silver, copper, aluminum, titanium, tantalium, alloy, carbon black or other appropriate materials, or a combination thereof). The conductive pattern 156a is formed at where the alignment film 158 is not formed. If the conductive pattern 156 employs a transparent material, the opaque conductive pattern 156a may form by performing laser burn on the transparent conductive pattern, for example, performing laser burn on the electrode layer 152 using a laser at a wavelength of about 200 nm to about 400 nm and with a power of about 1 MW to about 10 MW or by directly using metal (such as, gold, silver, copper, aluminum, titanium, tantalium, alloy, other appropriate materials, or a combination thereof) or other opaque conductive material as a material for the conductive pattern 156 to form the opaque conductive pattern 156a.

In the embodiment of the disclosure shown in FIG. 4, aside from forming an opaque region 162a above the second substrate 104, an opaque conductive pattern 156a is formed on the first substrate 102. However, in other embodiments, only the opaque conductive pattern 156a is formed above the first substrate 102, while an opaque region 162a is not formed above the second substrate 104.

Second Exemplary Embodiment

Figure 5:
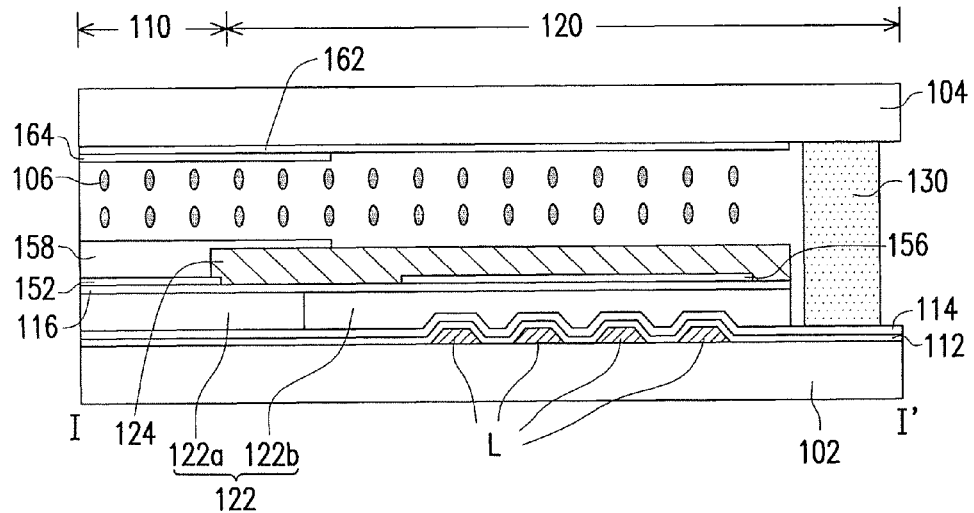

It should be appreciated that the present disclosure does not particularly limit the organic layer 122 to cover the light shielding pattern layer 124 as in the exemplary embodiment shown in FIGS. 1, 3 and 4. In other exemplary embodiments, the light shielding pattern 124 may cover the organic layer 122. Referring to FIG. 5, the exemplary embodiment shown in FIG. 5 is similar to that in FIG. 1, the difference only lies in the disposition of the organic layer 122 on the passivation layer 114, and the disposition of the light shielding pattern layer 124 on the organic layer 122. In one embodiment of the disclosure, the surface of the organic layer 122 further includes a passivation layer 116 covering thereon. Moreover, in the exemplary embodiment shown in FIG. 5, the conductive pattern 156 is configured between the light shielding pattern layer 124 and the organic layer 122 (or passivation layer 116). Since the conductive pattern layer 156 may form concurrently with the pixel electrode 152, the pixel electrode 152 is formed on the passivation layer 116, and the light shielding pattern layer 124 exposes the pixel electrode 152, and the alignment layer 158 covers the pixel electrode 152 and the border of the light shielding pattern layer 124. In other words, a portion of the upper surface of the light shielding pattern 124 is exposed to the display medium layer 106. It is preferred, in this exemplary embodiment, that the edge of the alignment layer 158 is aligned with the edge of the alignment layer 164.

Figure 6:
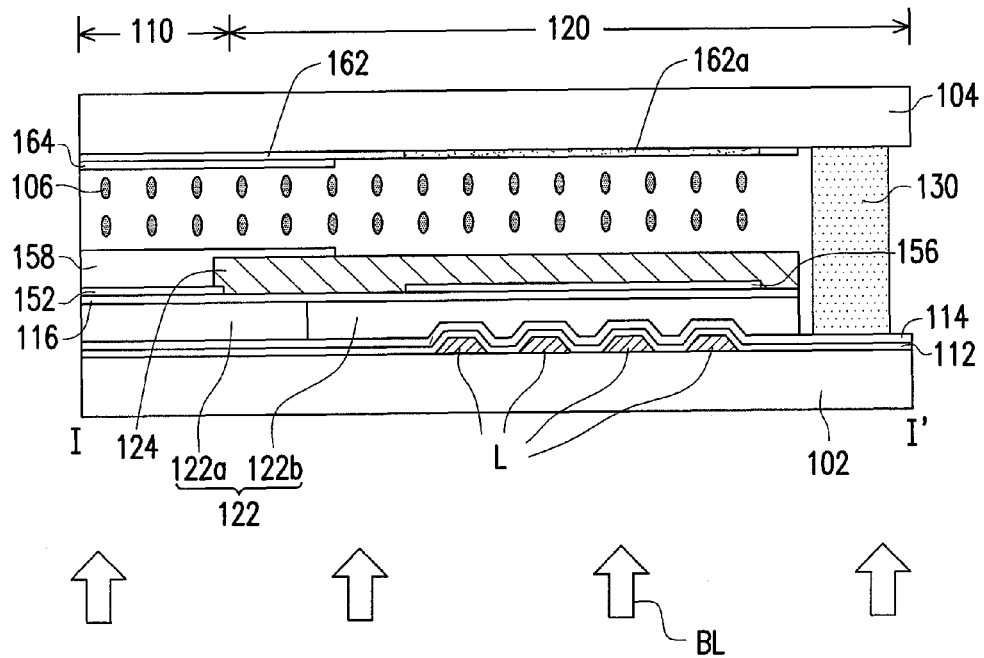

Similarly, according to the exemplary embodiment shown in FIG. 5, an opaque region 162a may further form above the second substrate 104 as shown in FIG. 6. The opaque region 162 is formed at where the alignment film 164 is not formed. The exemplary embodiment illustrated in FIG. 6 is similar to that in FIG. 5, the only difference lies in the formation of an opaque region 162a above the second substrate 104. The above opaque region 162a may form by a laser burning method, for example, by laser burning on the transparent electrode layer 162 at a wavelength of about 200 nm to about 400 nm and with a power of about 1 MW to about 10 MW to provide the conductive electrode layer 162, above the lead lines L, with an opaque region 162a, wherein the opaque region 162a has conductive property. In other exemplary embodiments, the opaque region 162a may form by, for example, ink-printing or depositing an opaque layer on the transparent electrode layer 162 that is correspondingly above the lead lines.

Figure 7:
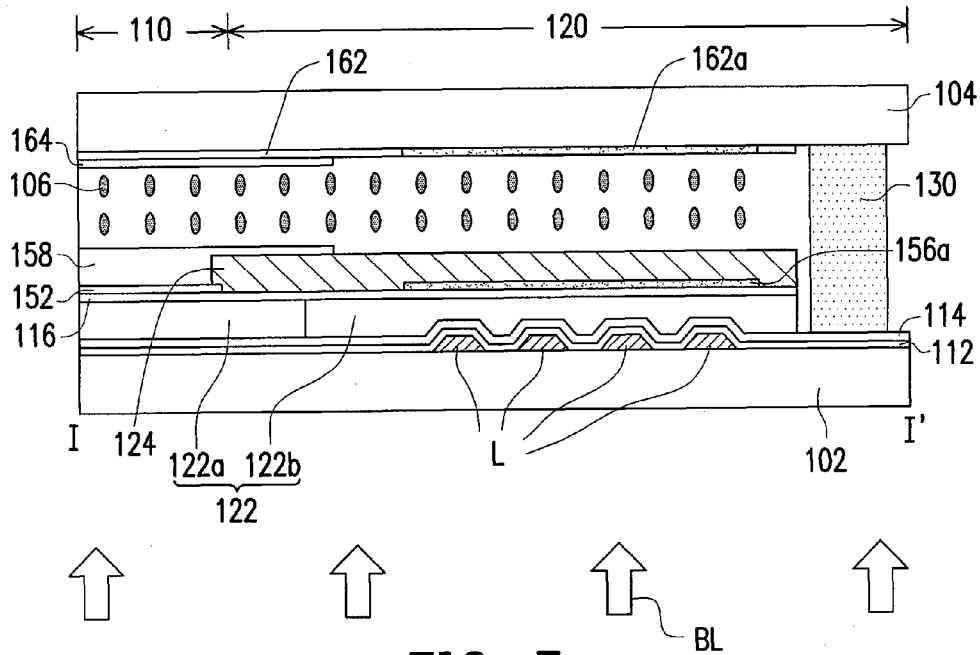

According to another embodiment of the disclosure, aside from forming an opaque region 162a above the second substrate 104, an opaque conductive pattern 156a may further form above the lead lines L, as shown in FIG. 7. The structure in the exemplary embodiment shown in FIG. 7 is similar to that in FIG. 6. The difference between the two exemplary embodiments lies in the conductive pattern 156a configured above the first substrate 102 being an opaque conductive pattern (such as, gold, silver, copper, aluminum, titanium, tantalum, alloy, carbon black or other appropriate materials, or a combination thereof). The opaque region 156a is formed at where the alignment film 158 is not formed. If the conductive pattern 156 is formed with a transparent material, the opaque conductive pattern 156a may form by performing laser burning on the transparent conductive pattern 156, for example, laser burning the electrode layer 152 with a laser at a wavelength of about 200 nm to about 400 nm and with a power of about 1 MW to about 10 MW power, or by directly using metal (such as, gold, silver, copper, aluminum, titanium, tantalum, alloy, other appropriate materials, or a combination thereof) or other opaque conductive materials as the material of the conductive pattern 156 to form the opaque conductive pattern 156a.

In the above exemplary embodiment illustrated in FIG. 7, aside from forming an opaque region 162a above the second substrate 104, an opaque conductive pattern 156a is formed above the first substrate 102. However, according to another embodiment of the disclosure, the opaque conductive pattern 156a is formed only above the first substrate 102, while an opaque region 162a is not formed above the second substrate 104.

Third Exemplary Embodiment

Figure 8:
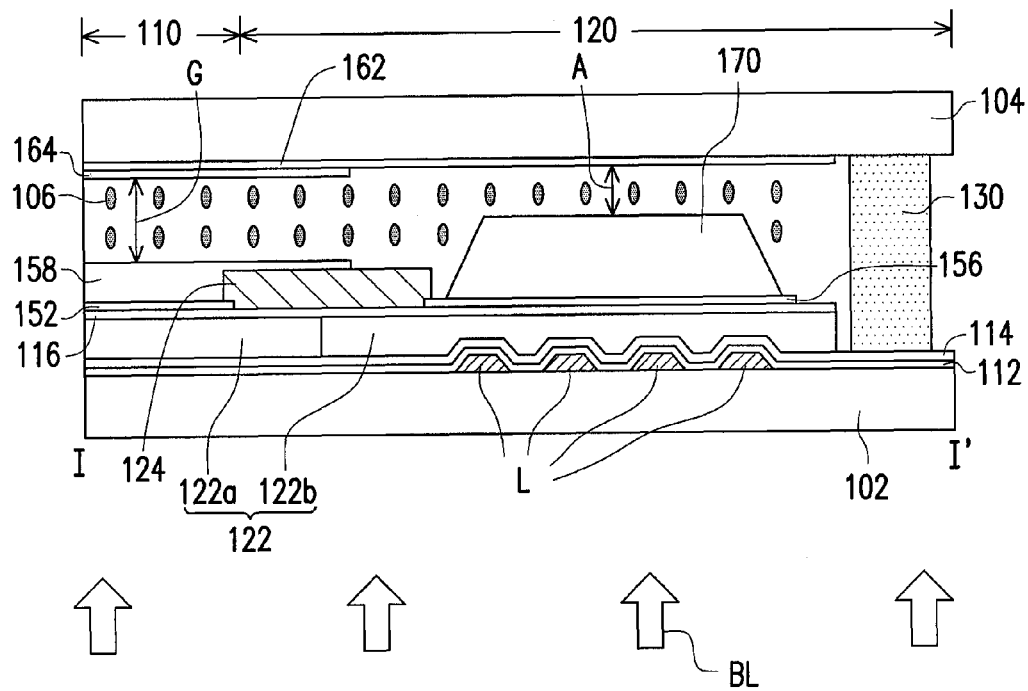

FIG. 8 is a partial cross-sectional view diagram of a display panel according to the first exemplary embodiment of the present disclosure. The exemplary embodiments in FIGS. 8 and 5 are similar. The difference between the two embodiments lies in the disposition of a dummy spacer 170 on the conductive pattern 156, in addition to the design of the conductive pattern 156 on the organic layer 122 above the lead lines L and the electrical connection of the conductive pattern 156 and the conductive layer 164 to a common voltage. More specifically, the dummy spacer 170 and the transparent electrode layer 162 on the second substrate 104 maintain a gap (A) therebetween. If the display medium 106 in the display region 110 has a thickness (G), the relationship between the gap (A) and the thickness (G) is A≧½G. A dummy spacer 170 is designed to move aside the display medium (such as liquid crystal molecules) 106 above the lead lines L without affecting the thickness (G) of the display medium 106 in the display region 110 of the display panel. Further, in the exemplary embodiment shown in FIG. 8, the lower part of the dummy spacer 170 is not covered with a light shielding pattern 124. In other words, the dummy spacer 170 is configured directly on the conductive pattern 156, and the light shielding pattern 124 in the non-display region 120 is positioned between the dummy spacer 170 and the display region 110, and the dummy spacer 170 is not covered by the light shielding pattern 124.

Figure 9:
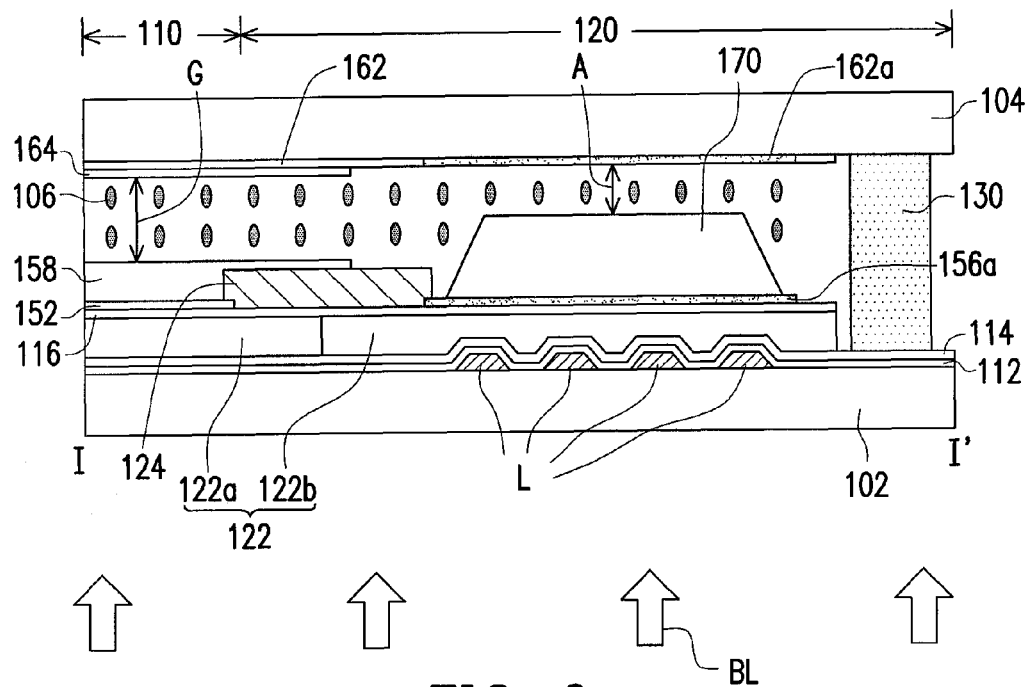

Similarly, according the exemplary embodiment in FIG. 8, an opaque region 162 is provided above the second substrate 104 and a conductive pattern 156a with an opaque material is also provided as shown in FIG. 9. The methods in forming the opaque region 162a and the conductive pattern 156a of an opaque material are similar to those methods discussed above for other exemplary embodiments, and will not be further reiterated. It should be appreciated that the present disclosure is not limited to concurrently provide an opaque region 162a above the second substrate 104 and to apply a conductive pattern 156a of an opaque material above the first substrate 102, as shown in FIG. 9. In other embodiments of the disclosure, only an opaque region 162a is provided above the second substrate 104 or only conductive pattern 156a of an opaque material is provided above the first substrate 102.

Figure 10:
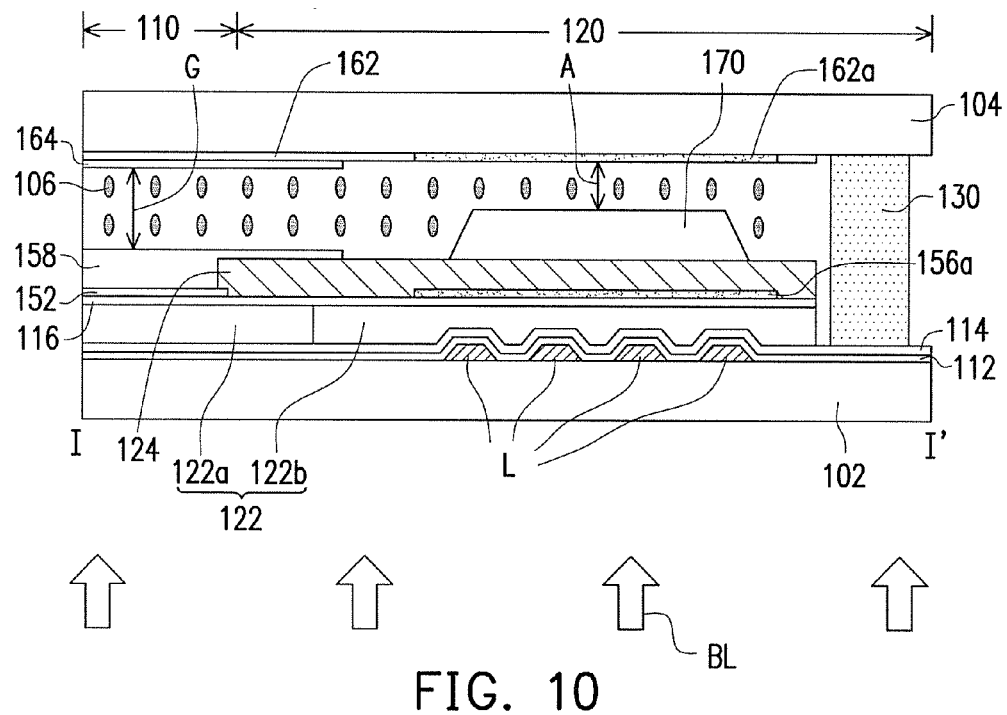

In the exemplary embodiments shown in FIGS. 8 and 9, no light shielding pattern layer 124 is disposed above the lead lines L. However, the present disclosure is not limited as such. In other embodiments of the disclosure, as shown in FIG. 10, the organic layer 122, disposed above the lead lines L, is also covered with the light shielding pattern layer 124, and the conductive pattern 156 is configured between the organic layer 122 and the light shielding pattern layer 124, while the dummy spacer 170 is configured above the light shielding pattern 124. The configurations of other elements may refer to the description of FIGS. 8 and 9. According to the embodiment of the disclosure shown in FIG. 10, an organic layer 122b is disposed in the non-display region 120. More preferably, the organic layer 122b disposed in the non-display region 120 is a blue color filter pattern. However, the present disclosure is not limited as such. In other embodiments of the disclosure, other colors filter pattern or other color layer with the light absorption effect similar to that of the blue color filter pattern may be used. The organic layer 122 is covered with a passivation layer 116. Moreover, the light shielding pattern layer 124 extends from the display region 110 to the non-display region1 120 and covers the organic layer 122b in the non-display region 120. Further, the conductive pattern 156 is disposed between the organic layer 122 and the light shielding pattern layer 124, and the dummy spacer 170 is disposed on the light shielding pattern 124 in the non-display region 120. It is preferred that the conductive pattern 156 configured between the organic layer 122 and the light shielding pattern 124 is a conductive pattern of an opaque material and an opaque region 162 is further provided above the second substrate 104.

Figure 11:
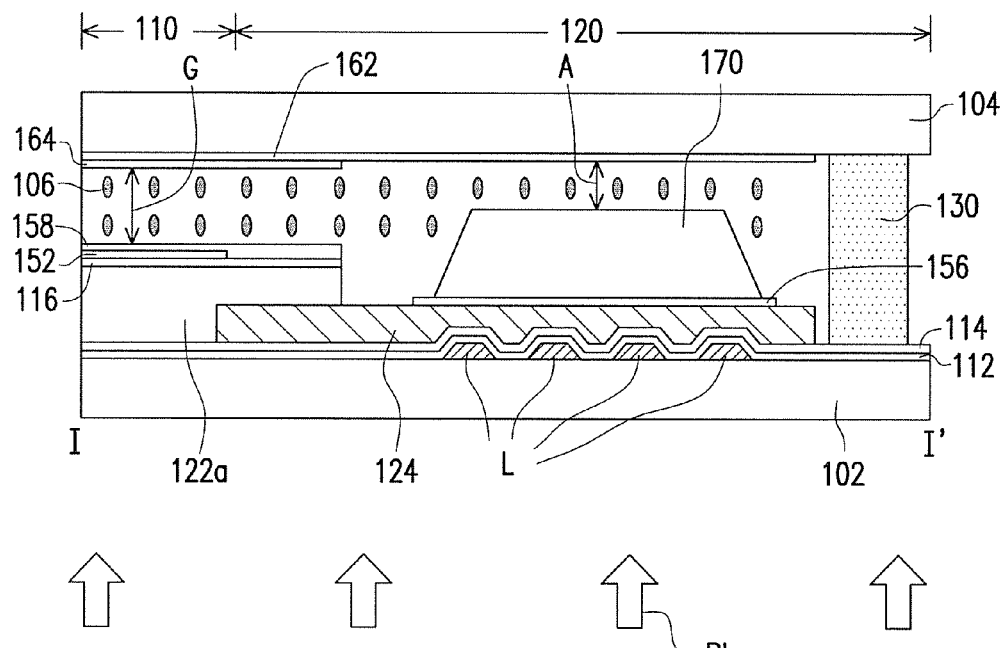

FIG. 11 is a partial cross-sectional view of a display panel according to one exemplary embodiment of the disclosure. The embodiments in FIGS. 11 and 1 are similar. The difference between the two embodiments lies in the disposition of a dummy spacer 170 on the conductive pattern 156, in addition to the design of the conductive pattern 156 on the organic layer 122 above the lead lines L and the electrical connection of the conductive pattern 156 and the conductive layer 164 to a common voltage. More specifically, the dummy spacer 170 and the transparent electrode layer 162 disposed above the second substrate 104 maintain a gap (A) therebetween. If the display medium 106 in the display region 110 has a thickness (G), the relationship between the gap (A) and the thickness (G) is $A \geqq \frac{1}{2}G$. A dummy spacer 170 is designed to move aside the portion of the display medium (such as liquid crystal molecules) 106 above the lead lines without affecting the thickness (G) of the display medium 106 in the display region 110 of the display panel. Further, in the exemplary embodiment shown in FIG. 11, the organic layer 122a is configured only in the display region 110, an organic layer is not disposed in the non-display region 120. Moreover, the light shielding pattern layer 124 extends from the display region 110 to the non-display region 120, and covers the entire non-display region 120. Further, the conductive pattern 156 configured on the light shielding pattern 124 of the non-display region 120, and the dummy spacer 170 is configured on the conductive pattern 156.

Figure 12:
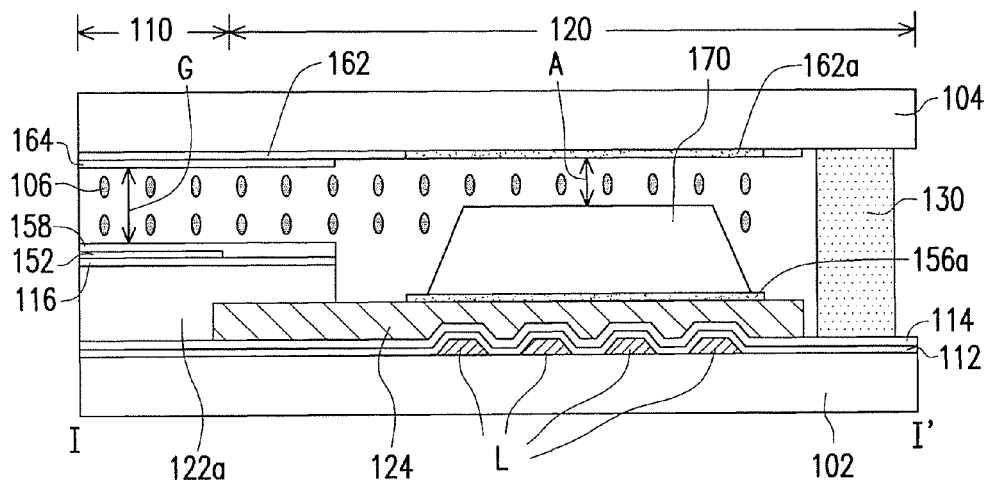

According to the embodiment in FIG. 11, an opaque region 162a is provided above the second substrate 104 and a conductive pattern 156a of an opaque material is provided above the first substrate 102, as shown in FIG. 12. The methods in forming the opaque region 162a and the conductive pattern 156a of an opaque material may be similar to those methods discussed above, and will not be further reiterated. It should be appreciated that the present disclosure is not limited to concurrently provide an opaque region 162a above the second substrate 104 and a conductive pattern 156a of an opaque material above the first substrate 102, as shown in FIG. 12. In other embodiments of the disclosure, only an opaque region 162a is provided above the second substrate 104 or only a conductive pattern 156a of an opaque material is provided above the first substrate 102.

Figure 13:
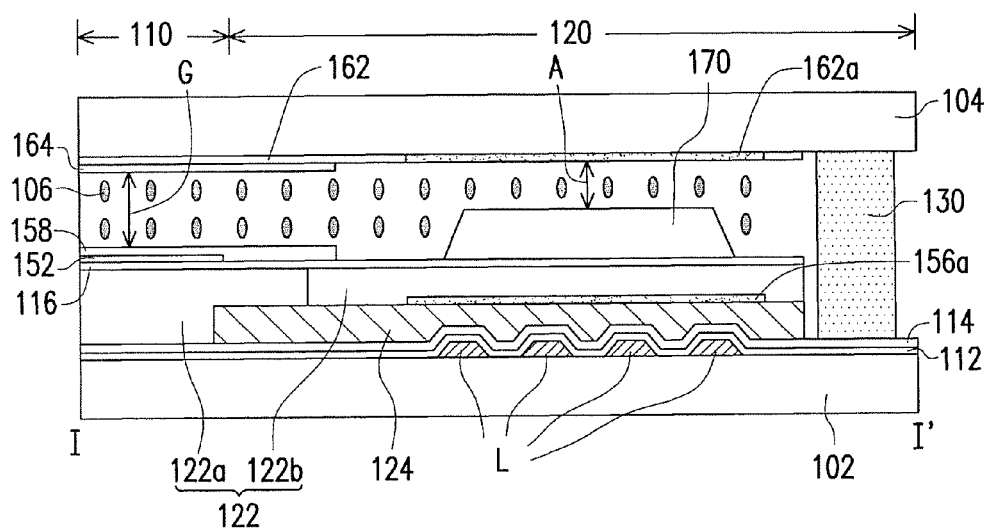

In the exemplary embodiments shown in FIGS. 11 and 12, no organic layer 122b is provided above the lead lines L. However, the present disclosure is not limited as such. In other embodiments, as shown in FIG. 13, the light shielding pattern layer 124, configured above the lead lines L, is also covered with the organic layer 122b, and the conductive pattern 156 is configured above the organic layer 122b, while the dummy spacer 170 is configured above the organic layer 122b. More particularly, in the exemplary embodiment shown in FIG. 13, the light shielding pattern layer 124 extends from the display region 110 to the non-display region 120, and covers the lead lines in the non-display region 120. Moreover, the organic layer 122b is configured in the non-display region 120 according to this embodiment of the disclosure. It is preferred that the organic layer 122b disposed in the non-display region 120 is a blue color filter pattern. However, the present disclosure is not limited as such. In other embodiments of the disclosure, other colors filter pattern or other color layers with the light absorption effect similar to that of the blue color filter pattern may be used. The organic layer 122 is covered with a passivation layer 116. Moreover, the conductive pattern 156 is configured in between the organic layer 122 and the light shielding pattern layer 124, while the dummy spacer 170 is configured above the organic layer 122b (passivation layer 116) in the non-display region 120. More preferably, the conductive pattern 156 configured between the organic layer 122 and the light shielding pattern layer 124 is a conductive pattern 156a of an opaque material. Furthermore, the transparent electrode layer 162 on the second substrate 104 further includes an opaque region 162a.

In the above exemplary embodiments, the combination of a conductive pattern, an organic layer, a light shielding layer, a dummy spacer is formed above the lead lines that are connected to the scan lines SL for preventing the situation of light leakage at where the lead lines are located. It should be appreciated that the present disclosure is not limited to forming the combination of a conductive pattern, an organic layer, a light shielding layer above the lead lines connected with the scan lines. If required, the combination of a conductive pattern, an organic layer, a light shielding layer may form above the lead lines L' that are connected to the data lines DL to prevent light leakage at the lead lines L'. It should be understood that the above combination of a conductive pattern, an organic layer, a light shielding layer may form above the lead lines L, L' that are respectively connected to the scan lines SL and data lines DL to obviate the situation of light leakage.

Accordingly, by disposing a conductive pattern above the organic layer of the lead lines, the conductive pattern and the transparent electrode layer of the opposite substrate are electrically connected to a common voltage. Hence the conductive pattern and the counter electrodes (or namely the transparent electrode layer) are at a common voltage state, and the display medium layer (such as: liquid crystal layer) above the lead lines is prevented from generating an undesired twist due to the influence of the voltage of the lead lines. Hence, light leakage at where the lead lines are positioned is prevented. In some embodiments of the disclosure, the organic layer with a blue color filter pattern and light shielding pattern layer may further dispose above conductive pattern or a dummy spacer may be used to further reduce light leakage at the lead lines.

Although the disclosure herein refers to certain illustrated embodiments, it is to be understood that these embodiments are presented by way of example and not by way of limitation. The intent of the detailed description is to cover all modifications, alternatives, and equivalents as may fall within the spirit and scope of the disclosure as defined by the appended claims. Moreover, any embodiment of the disclosure or claims to achieve all the features, advantages or characteristics disclosed in the disclosure. Additionally, the abstract and the title of the disclosure are intended to facilitate patent search and not intended to be restrictive of the spirit and scope of the disclosure.

What is claimed is:

1. A display panel comprising a display region and a non-display region, the display panel comprising:
    a first substrate comprising:
        a pixel array, configured within the display region;
        a plurality of lead lines, positioned in the non-display region and electrically connected with the pixel array;
        an organic layer, covering the pixel array and the lead lines, wherein the organic layer comprises a color filter layer;
        a conductive pattern disposed on the organic layer above the lead lines;
    a second substrate comprising a transparent electrode layer thereon, wherein the transparent electrode layer is configured in the display region and the non-display region, and the transparent electrode layer and the conductive pattern are electrically connected to a common voltage; and
    a display medium, configured between the first substrate and the second substrate.

2. The display panel of claim 1, wherein the lead lines are gate lead lines.

3. The display panel of claim 1, wherein the color filter layer that covers the lead lines is a blue color filter layer.

4. The display panel of claim 1, wherein the first substrate further comprises a light shielding pattern layer, configured in the display region and the non-display region, and disposed under the organic layer.

5. The display panel of claim 4, wherein the light shielding pattern layer covers the lead lines, and the organic layer disposed on light shielding pattern layer above the lead lines comprises a blue color filter layer.

6. The display panel of claim 1, wherein the first substrate further comprises a light shielding pattern layer, configured in the display region and the non-display region, disposed above the organic layer, and covering the conductive pattern.

7. The display panel of claim 6, wherein the light shielding pattern layer covers the lead lines, and the organic layer configured above the lead lines comprises a blue color filter patter, and the conductive pattern is configured between the blue color filter pattern disposed above the lead lines and the light shielding pattern layer.

8. The display panel of claim 1, wherein the transparent electrode layer on the second substrate comprises an opaque region, which is positioned correspondingly to the location of the lead lines.

9. The display pane of claim 8, wherein the opaque region of the transparent electrode layer comprises a laser-burnt electrode layer or a region of the transparent electrode layer covered with an opaque material.

10. The display panel of claim 1, wherein the conductive pattern of the first substrate is an opaque conductive pattern.

11. The display panel of claim 10, wherein the opaque conductive pattern comprises a laser-burnt conductive pattern or a conductive pattern covered with an opaque material.

12. The display panel of claim 1, wherein the first substrate also comprises a dummy spacer configured on the conductive patter, wherein the dummy spacer and the transparent electrode layer of the second substrate maintains a gap (A).

13. The display panel of claim 12, wherein the display medium in the display region has a thickness (G), and $A \geq \frac{1}{2}G$.

14. The display panel of claim 1, wherein the first substrate comprises:
    a first passivation layer, configured in the display region and the non-display region, and covering the lead lines; and
    a second passivation layer, covering the organic layer.

15. The display panel of claim 1, wherein a material of the conductive pattern comprises metal oxide or metal.

* * * * *